United States Patent
Yoshida

(10) Patent No.: US 9,019,835 B2
(45) Date of Patent: Apr. 28, 2015

(54) PARAMETER ESTIMATION DEVICE, PARAMETER ESTIMATION METHOD, AND PARAMETER ESTIMATION PROGRAM

(75) Inventor: Hiroshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/129,034

(22) PCT Filed: Jun. 12, 2012

(86) PCT No.: PCT/JP2012/003804
§ 371 (c)(1),
(2), (4) Date: Dec. 23, 2013

(87) PCT Pub. No.: WO2013/008387
PCT Pub. Date: Jan. 17, 2013

(65) Prior Publication Data
US 2014/0133316 A1    May 15, 2014

(30) Foreign Application Priority Data

Jul. 8, 2011  (JP) .................................. 2011-151349
Sep. 5, 2011  (JP) .................................. 2011-192642

(51) Int. Cl.
H04L 12/26        (2006.01)
H04L 12/825       (2013.01)

(52) U.S. Cl.
CPC ............ H04L 43/0888 (2013.01); H04L 43/04 (2013.01); H04L 47/25 (2013.01)

(58) Field of Classification Search
CPC ................................................. H04L 43/0888
USPC .................. 370/250, 229, 232, 235
See application file for complete search history.

(56) References Cited

U.S. PATENT DOCUMENTS

2004/0233846 A1 *  11/2004  Khandani et al. ............. 370/235

FOREIGN PATENT DOCUMENTS

JP          2003-37649 A      2/2003
WO      WO-2012/066748 A1    5/2012

OTHER PUBLICATIONS

International Search Report corresponding to International Application No. PCT/JP2012/003804, dated Sep. 6, 2012, 5 pages.
Takayuki Goto et al. "Lightweight TCP Throughput Estimation Method in CDMA2000 1xEV-DO Network", The Transactions of the Institute of Electronics, Information and Communication Engineers, vol. J93-B, No. 7, Jul. 1, 2010, pp. 977-986.
Hiroshi Yoshida et al., "TCP Throughput no Kakuritsuteki Kakusan Yosoku ni Motozuku Eizo Haishin Seigyo", Video Streaming Control by Predicting Stochastic Diffusion of TCP Throughput, Internet Conference 2011, Oct. 28, 2011, pp. 57-66.

(Continued)

*Primary Examiner* — Dang Ton
*Assistant Examiner* — Kevin Lee
(74) *Attorney, Agent, or Firm* — Wilmer Cutler Pickering Hale and Dorr LLP

(57) ABSTRACT

A parameter estimation device 600 includes: a communication throughput acquiring part 601 for acquiring communication throughput that is an amount of data transmitted per unit time; and a function specification parameter estimating part 602 for estimating a function specification parameter for specifying a probability density function where communication throughput at a second time point later than a first time point is a random variable, based on the communication throughput acquired by the first time point.

15 Claims, 9 Drawing Sheets

(56) References Cited

OTHER PUBLICATIONS

Extended European Search Report issued by the European Patent Office for European Application No. 12811739.7 mailed on Dec. 12, 2014 (5 pages).

Goto, T. et al., "TCP Throughput Estimation by Lightweight Variable Packet Size probing in CDMA2000 1x EV-DO Network," Applications and the Internet, 2009 Ninth Annual International Symposium on Applications and the Internet, IEEE, Piscataway, NJ, USA, pp. 1-8 (Jul. 20, 2009).

* cited by examiner

PARAMETER ESTIMATION DEVICE, PARAMETER ESTIMATION METHOD, AND PARAMETER ESTIMATION PROGRAM

CROSS-REFERENCE TO RELATED APPLICATIONS

This application is a national stage application of International Application No. PCT/JP2012/003804 entitled "Parameter Estimating Device, Parameter Estimating Method, and Parameter Estimating Program," filed on Jun. 12, 2012, which claims the benefit of the priority of Japanese Patent Application No. 2011-151349, filed on Jul. 8, 2011, and Japanese Patent Application No. 2011-192642, filed on Sep. 5, 2011, the disclosures of each of which are hereby incorporated by reference in their entirety.

TECHNICAL FIELD

The present invention relates to a communication throughput prediction device that estimates communication throughput and a control parameter determination device that determines a control parameter used for transmitting data.

BACKGROUND ART

A communication throughput prediction device that estimates communication throughput, which is the size (the amount) of data delivered (transmitted) per unit time, is known. As one of this type of communication throughput prediction devices, a communication throughput prediction device described in Patent Document 1 transmits test data having a predetermined data size, and measures a time required for transmission of the test data to be completed. Then, the communication throughput prediction device predicts future communication throughput, based on the measured time.

Patent Document 1: Japanese Unexamined Patent Application Publication No. 2003-037649

Communication throughput in communication using TCP/IP (Transmission Control Protocol/Internet Protocol) relatively largely changes in a short period of time due to complicated action of various factors (e.g., End-to-End delay, packet loss, cross traffic, the intensity of radio waves in radio communication, etc.).

For example, in the communication throughput prediction device, communication throughput may decrease due to increase of cross traffic after transmission of test data is completed, or communication throughput may increase due to increase of the intensity of radio waves in radio communication. In these cases, there is a problem that the communication throughput prediction device cannot estimate communication throughput with high accuracy.

SUMMARY

Accordingly, an object of the present invention is to provide a parameter estimation device capable of solving the abovementioned problem, "there is a case where the accuracy of estimation of communication throughput becomes excessively low."

In order to achieve the object, a parameter estimation device as an exemplary embodiment of the present invention includes:

a communication throughput acquiring means for acquiring communication throughput that is an amount of data transmitted per unit time; and a function specification parameter estimating means for estimating a function specification parameter for specifying a probability density function where communication throughput at a second time point later than a first time point is a random variable, based on the communication throughput acquired by the first time point.

Further, a parameter estimation method as another exemplary embodiment of the present invention is a method including:

acquiring communication throughput that is an amount of data transmitted per unit time; and estimating a function specification parameter for specifying a probability density function where communication throughput at a second time point later than a first time point is a random variable, based on the communication throughput acquired by the first time point.

Further, a parameter estimation program as another exemplary embodiment of the present invention is a program including instructions for causing an information processing device to perform operations including:

acquiring communication throughput that is an amount of data transmitted per unit time; and estimating a function specification parameter for specifying a probability density function where communication throughput at a second time point later than a first time point is a random variable, based on the communication throughput acquired by the first time point.

With the configurations as described above, the present invention can increase the accuracy of estimation of communication throughput.

EXEMPLARY EMBODIMENTS

Referring to FIGS. 1 to 10, the respective exemplary embodiments of a parameter estimation device, a parameter estimation method and a parameter estimation program according to the present invention will be described below.
<First Exemplary Embodiment>

Figure 1:
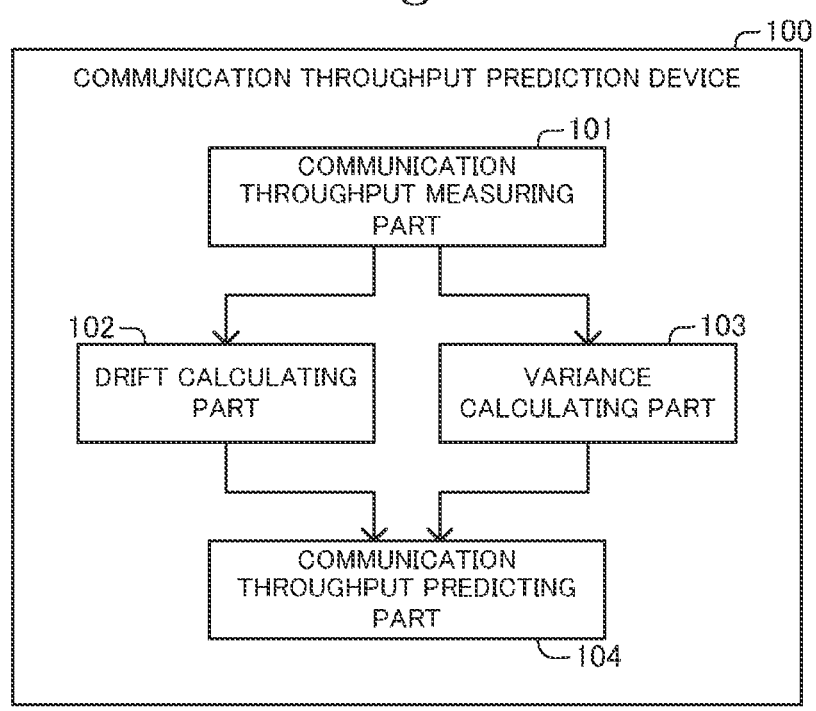
FIG. 1 is a block diagram showing a function of a communication throughput prediction device according to a first exemplary embodiment of the present invention.

As shown in FIG. 1, a communication throughput prediction device (a parameter estimation device) 100 according to a first exemplary embodiment is a device that predicts communication throughput. Communication throughput is the amount of data transmitted per unit time.

The communication throughput prediction device 100 is an information processing device. For example, the communication throughput prediction device 100 is a personal computer, a mobile phone terminal, a PHS (Personal Handyphone System), a PDA (Personal Data Assistance, Personal Digital Assistant), a smartphone, a car navigation terminal, a game terminal, or the like.

The communication throughput prediction device 100 includes a central processing unit (CPU) and a storage device (a memory and a hard disk drive (HDD)), which are not illustrated in the drawings. The communication throughput prediction device 100 is configured to realize a function described later by the CPU's execution of a program stored in the storage device.
(Function)

FIG. 1 is a block diagram showing a function of the communication throughput prediction device 100 configured as described above. The function of the communication throughput prediction device 100 includes a communication throughput measuring part (a communication throughput acquiring means) 101, a drift calculating part 102, a variance calculating part 103, and a communication throughput predicting part (a communication status estimating means) 104. The drift calculating part 102 and the variance calculating part 103 configure a function specification parameter estimating means.

The communication throughput measuring part 101 measures (acquires) current communication throughput (communication throughput at a current time point) in transmission of data to be the target of prediction of communication throughput (in this exemplary embodiment, transmission by streaming). The communication throughput prediction device 100 may be configured to acquire communication throughput by receiving from another device.

In this exemplary embodiment, transmission of data to be the target of prediction of communication throughput is transmission of data representing a moving image from a server device to a client device connected with the server device via a communication network. The client device is configured to reproduce a moving image based on received data.

Further, in this exemplary embodiment, the server device transmits data to the client device via the communication network by using TCP/IP (Transmission Control Protocol/Internet Protocol). Therefore, in this exemplary embodiment, communication throughput predicted by the communication throughput prediction device 100 is communication throughput in a TCP session established between the server device and the client device.

The communication throughput prediction device 100 may be configured to acquire communication throughput relating to data transmitted by using a communication protocol that is other than TCP/IP and that ensures arrival of data.

Further, given that current communication throughput at certain time t [sec] is u(t) [bps (bit per second)], the current communication throughput u(t) is calculated as shown by Formula 1;

$$u(t) = \frac{\Delta S}{\Delta T} \qquad \text{[Formula 1]}$$

where $\Delta T$ [sec] is a preset time (e.g., 2 [sec]), and $\Delta S$ [bit] is the amount of data (the size of data) transmitted during a period from time $t-\Delta T$ that is $\Delta T$ earlier than the time t to the time t.

In this exemplary embodiment, the communication throughput measuring part 101 measures current communication throughput u every preset interval I [sec]. Thus, the communication throughput measuring part 101 acquires time series data u(nI) (a series of data measured with time) of communication throughput, where n takes integers 1 to N, and N denotes the number of times that the communication throughput n is measured up to a first time point (in this exemplary embodiment, a current time point).

The drift calculating part 102 calculates drift based on the time series data u(nI) of the communication throughput u acquired by the communication throughput measuring part 101. Drift represents a long-term temporal change rate of the communication throughput u. Drift forms part of a function specification parameter. Herein, a function specification parameter is a parameter for specifying a probability density function (a probability density function shown by Formula 5 described later) in which a random variable is communication throughput at a second time point (in this exemplary embodiment, a future time point) later than the first time point.

In this exemplary embodiment, the drift calculating part 102 calculates drift based on the latest m time series data u(NI), u((N−1)I), . . . , u((N−m+1)I) of all the time series data u(nI) acquired by the communication throughput measuring part 101.

To be specific, the drift calculating part 102 calculates the slope of a linear function approximating the time series data u(NI), u((N−1)I), . . . , u((N−m+1)I) as drift by using the least squares method. That is to say, the drift calculating part 102 calculates drift μ as shown by Formula 2;

$$\mu = \frac{m\sum \{kIu(kI)\} - \sum (kI) \sum u(kI)}{m\sum (kI)^2 - \{\sum (kI)\}^2} \qquad \text{[Formula 2]}$$

where $\Sigma X_k$ denotes the sum of $X_k$ when k takes integers from "N−m+1" to "N."

The drift calculating part 102 may be configured to calculate drift by using the weighted least squares method that communication throughput measured at a time point closer to a current time point is more largely weighted.

Further, the drift calculating part 102 may be configured to calculate the derivative of the time series data u(nI) at time t (=NI) as drift. In this case, it is preferred that the drift calculating part 102 is configured to calculate drift μ by using the simplest three point formula.

$$\mu = \frac{3u(NI) - 4u((N-1)I) + u((N-2)I)}{2\Delta T} \quad \text{[Formula 3]}$$

In a case where ΔT is set to a relatively small value, the measured communication throughput u(nI) relatively largely changes. In this case, it is preferred that the drift calculating part 102 is configured to smooth the time series data u(nI) by passing through a low-pass filter (e.g., an IIR (Infinite Impulse Response) filter) and calculate the derivative based on the smoothed time series data u(nI). Thus, it is possible to calculate drift with high accuracy.

The variance calculating part 103 calculates variance $\sigma^2$ of the time series data u(nI) of the communication throughput u acquired by the communication throughput measuring part 101. Variance forms part of a function specific parameter.

To be specific, the variance calculating part 103 calculates unbiased variance as variance $\sigma^2$ as shown by Formula 4;

$$\sigma^2 = \frac{1}{m-1} \sum \{u_{ave} - u(kI)\}^2 \quad \text{[Formula 4]}$$

where $u_{ave}$ denotes a value obtained by averaging the latest m time series data u(NI), u((N−1)I), . . . , u((N−m+1)I) of all the time series data u(nI) acquired by the communication throughput measuring part 101.

In this exemplary embodiment, the communication throughput prediction device 100 is configured to use the current time point (i.e., a time point to execute a process of calculating a function specific parameter) as the first time point. The communication throughput prediction device 100 may use a time point earlier than the current time point, as the first time point. In this case, the communication throughput prediction device 100 may use, as the second time point, a time point earlier than the current time point, the current time point, or a time point later than the current time point in a range of time points later than the first time point.

The communication throughput predicting part 104 calculates a probability that actual communication throughput at future time t is within a target range, based on the drift μ calculated by the drift calculating part 102, the variance $\sigma^2$ calculated by the variance calculating part 103, and a probability density function f(u,t) shown by Formula 5. A target range is a range of communication throughput set in advance.

$$\int (u, l) = N(u_0 + \mu l, \sigma^2 l) = \frac{1}{\sqrt{2\pi\sigma^2 t}} \exp\left\{-\frac{(u - u_0 - \mu t)^2}{2\sigma^2 t}\right\} \quad \text{[Formula 5]}$$

The communication throughput predicting part 104 may be configured to calculate the upper bound value and lower bound value of a target probability range at future time t. A target probability range is a range of communication throughput that a value obtained by integrating the probability density function f(u,t) over the target probability range is a preset target probability value. Further, a target probability value is the value of a probability to be the target.

Further, the communication throughput predicting part 104 may be configured to estimate a time required for transmission of data to be completed, based on at least one of the calculated upper bound value and lower bound value of the target probability range.

Further, the communication throughput predicting part 104 may be configured to estimate the amount of data that can be transmitted in a period at or after the first time point, based on at least one of the calculated upper bound value and lower bound value of the target probability range.

Thus, it can be said that the communication throughput predicting part 104 stochastically predicts communication throughput u at future time t, based on drift μ calculated by the drift calculating part 102, variance $\sigma^2$ calculated by the variance calculating part 103, and the probability density function f(u,t) shown by Formula 5.

A method for deriving Formula 5 will be described. In this exemplary embodiment, Formula 5 is derived with the assumption that communication throughput changes so as to perform Brown motion with drift. Change of communication throughput so as to perform Brownian motion with drift corresponds to that a stochastic process W with communication throughput as a random variable is a generalized Wiener process.

When a stochastic process B(t) is a Wiener process (i.e., Brownian motion) with variance $\sigma^2$, the following conditions (1) to (3) are satisfied:
(1) B(t) is an independent increment;
(2) with respect to any s and t>0, B(s+t)−B(s) follows N(0, $\sigma^2 t$); and
(3) B(0)=0, and B(t) is continuous when t=0.

Herein, N(μ,$\sigma^2$) represents a normal distribution with an expected value μ and variance $\sigma^2$. Moreover, B(t) being an independence increment refers to that, when 0≤s≤t≤s'≤t', B(t)−B(s) and B(t')−B(s') become independent random variables.

Further, when a stochastic process W(t) is a generalized Wiener process (i.e., Brownian motion with drift), W(t) is represented by using the abovementioned B(t) as shown by Formula 6.

$$W(t) = \mu t + \sigma B(t) \quad \text{[Formula 6]}$$

In addition, a probability density function $f_w(x)$ with respect to a random variable x after t [sec] of the generalized Wiener process W(t) is expressed as shown by Formula 7.

$$f_w(x) = N(\mu t, \sigma^2 t) = \frac{1}{\sqrt{2\pi\sigma^2 t}} \exp\left\{-\frac{(x - \mu t)^2}{2\sigma^2 t}\right\} \quad \text{[Formula 7]}$$

Therefore, in a case where communication throughput u changes according to a generalized Wiener process, given that time t at a current time point is 0 [sec] and communication throughput u at the current time point (i.e., t=0 [sec]) is u(0)=$u_0$, a probability density function f(u,t) with communication throughput u at future time t [sec] as a random variable is expressed as shown by Formula 5. Thus, Formula 5 is derived.

Figure 2:
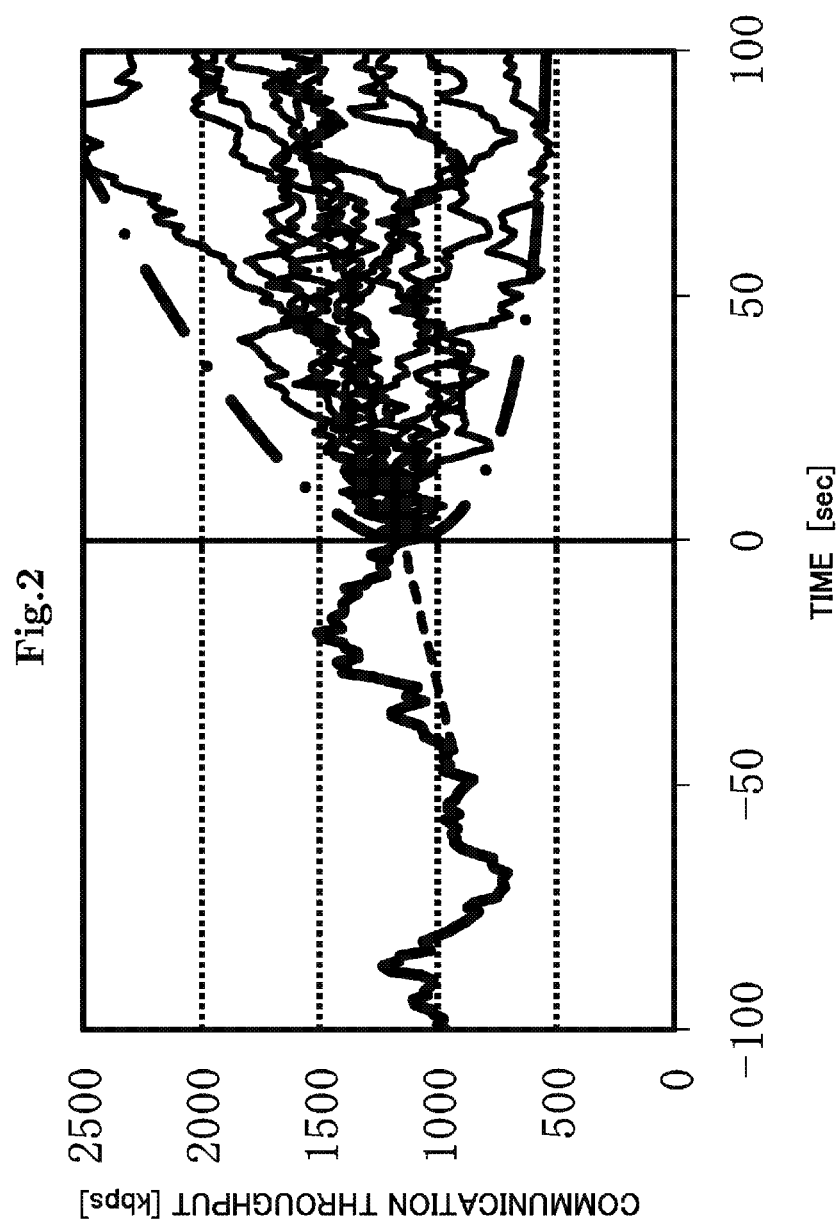
FIG. 2 is a graph showing an example of change of communication throughput following a probability density function used by the communication throughput prediction device according to the first exemplary embodiment of the present invention.

FIG. 2 is a graph showing an example of change of communication throughput following the probability density function f(u,t) shown by Formula 5. Communication throughput from the current time point (t=0) to 100 [sec] later is shown by a plurality of continuous lines. These communication throughputs are values acquired by executing Monte Carlo simulation based on the probability density function f(u,t) when μ=5, 6=50 and $u_0$=1144 [kbps].

As shown by Formula 5, the variance of the probability density function f(u,t) of communication throughput u changes in direct proportion to time t. That is to say, the standard deviation of the probability density function f(u,t) changes in direct proportion to the square root $t^{1/2}$ of time t. A dashed dotted line is a curve showing a value changing in direct proportion to the square root $t^{1/2}$ of time t.

Thus, in FIG. 2, the width (or variation) of change of communication throughput acquired by simulation falls within a range drawn by the dashed dotted line, and therefore, it is apparent that the communication throughput changes in direct proportion to the square root $t^{1/2}$ of time 2.

Figure 3:
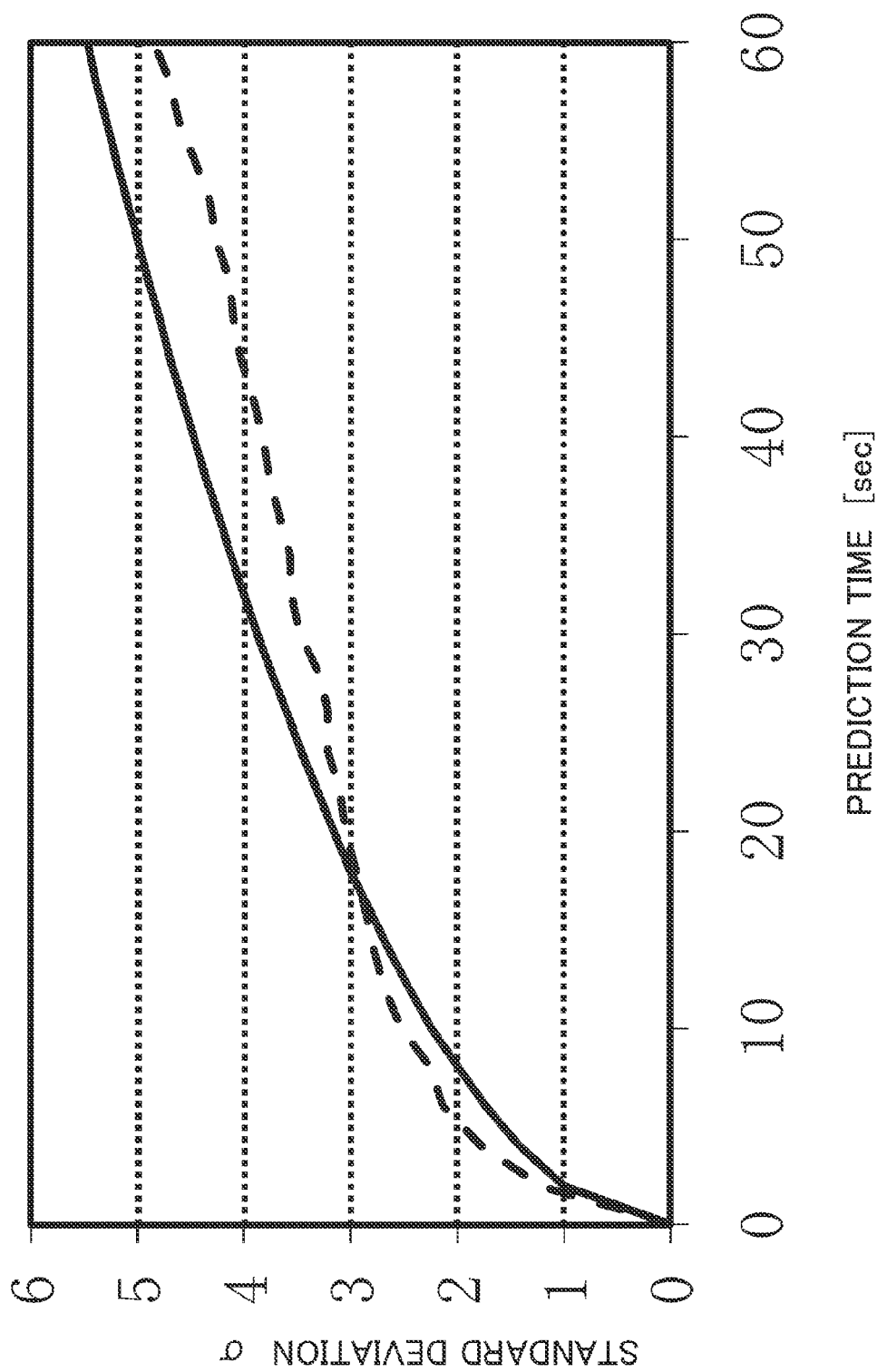
FIG. 3 is a graph in which a standard deviation calculated based on the probability density function used by the communication throughput prediction device according to the first exemplary embodiment of the present invention is compared with a standard deviation calculated based on communication throughput measured in an actual communication network.

FIG. 3 is a graph showing comparison between a standard deviation calculated based on the probability density function f(u,t) shown by Formula 5 and a standard deviation calculated based on communication throughput measured on an actual communication network. A dashed line shows the standard deviation calculated based on the communication throughput measured on the actual communication network. A continuous line shows the standard deviation calculated based on the probability density function f(u,t) shown by Formula 5 (i.e., the standard deviation changing in direct proportion to the square root $t^{1/2}$ of time t).

A method for calculating the standard deviation based on the measured communication throughput will be described more specifically. First, actual communication throughput is measured every time a preset time $\Delta T$ passes.

At time $t_0$ when communication throughput is measured, drift $\mu(t_0)$ and a standard deviation $\sigma(t_0)$ are calculated based on communication throughput measured in the past. After that, normalized communication throughput v with respect to a prediction time T $(=t_1-t_0)$ is calculated based on communication throughput $u(t_1)$ measured at time $t_1$ $(>t_0)$, communication throughput $u(t_0)$ measured at time $t_0$, and Formula 8.

$$v = \frac{u(t_1) - u(t_0) - \mu(t_0)T}{\sigma(t_0)} \quad \text{[Formula 8]}$$

This process is executed every time the preset time $\Delta T$ passes, with respect to various prediction times T. Then, a histogram (frequency distribution) of the normalized communication throughput v is acquired with respect to each of the prediction times T. Then, with respect to each of the prediction times T, the standard deviation is calculated based on the acquired histogram.

In FIG. 3, the standard deviation calculated based on the probability density function f(u,t) shown by Formula 5 has a value sufficiently close to the standard deviation calculated based on the communication throughput measured on the actual communication network. That is to say, a probability density function specified by the communication throughput prediction device 100 represents communication throughput on an actual communication network with high accuracy.

As described above, the communication throughput prediction device 100 according to the first exemplary embodiment of the present invention can increase the accuracy of estimation of communication throughput. To be specific, the communication throughput prediction device 100 can estimate communication throughput (e.g., the upper bound value and lower bound value of a target probability range) with high accuracy, based on a probability density function specified with an estimated function specification parameter.

The communication throughput prediction device 100 according to a modified example of the first exemplary embodiment may be configured to use, instead of the probability density function f(u,t) shown by Formula 5, a probability density function derived with the assumption that communication throughput changes so as to perform Brownian motion (i.e., Brownian motion without drift). Change of communication throughput so as to perform Brownian motion without drift corresponds to that a stochastic process W with communication throughput as a random variable is a Wiener process.

In this case, the communication throughput prediction device 100 according to this modified example is described by setting $\mu=0$ in the description of the first exemplary embodiment. Moreover, in this case, it is preferred that the function of the communication throughput prediction device 100 does not include the drift calculating part 102.

<Second Exemplary Embodiment>

Next, a delivery device according to a second exemplary embodiment of the present invention will be described. The delivery device according to the second exemplary embodiment is different from the communication throughput prediction device 100 according to the first exemplary embodiment, in delivering content, and in determining an encoding rate of content to be delivered based on a function specification parameter. Therefore, a description will be made below focusing on the different points.

Figure 4:
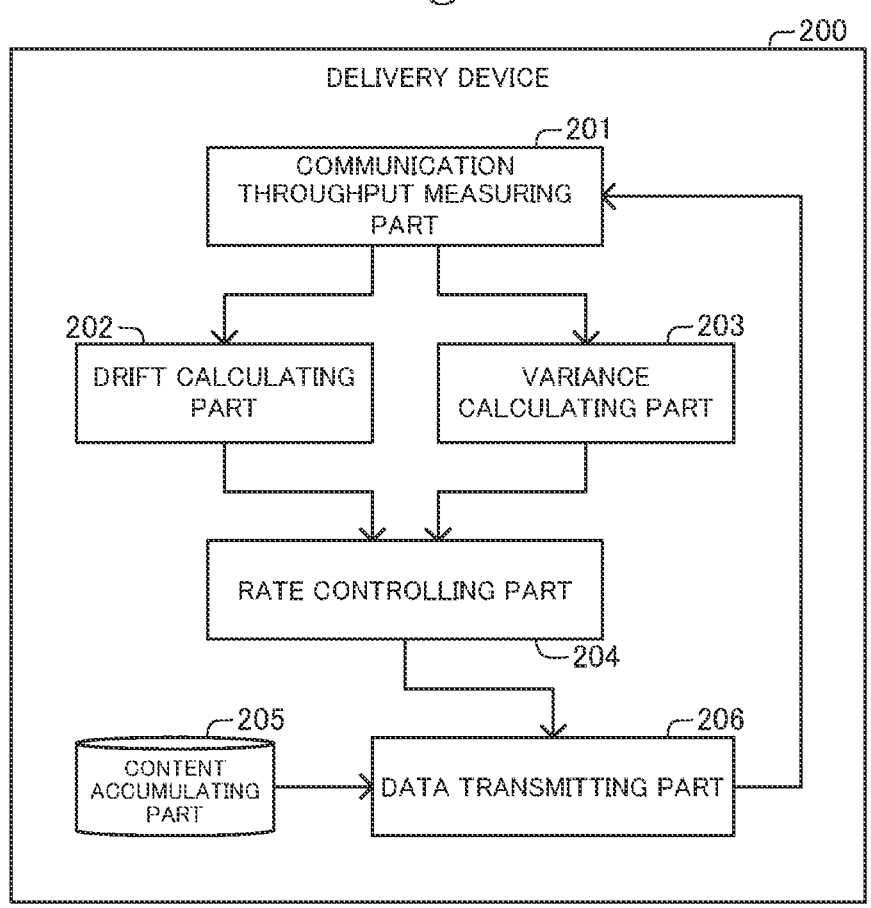
FIG. 4 is a block diagram showing a function of a delivery device according to a second exemplary embodiment of the present invention.

As shown in FIG. 4, a delivery device (a parameter estimation device) 200 according to the second exemplary embodiment is a device that transmits (delivers) data representing content. The delivery device 200 is an information processing device. The delivery device 200 includes a central processing unit (CPU) and a storage device (a memory and an HDD), which are not shown in the drawings. The delivery device 200 is configured to realize a function to be described later by the CPU's execution of a program stored in the storage device.

(Function)

FIG. 4 is a block diagram showing the function of the delivery device 200 configured as described above. The function of the delivery device 200 includes a communication throughput measuring part (a communication throughput acquiring means) 201, a drift calculating part 202, a variance calculating part 203, a rate controlling part (a control parameter determining means) 204, a content accumulating part 205, and a data transmitting part 206. The drift calculating part 202 and the variance calculating part 203 configure a function specification parameter estimating means.

The communication throughput measuring part 201, the drift calculating part 202 and the variance calculating part 203 have the same functions as the communication throughput measuring part 101, the drift calculating part 102 and the variance calculating part 103 according to the first exemplary embodiment, respectively. The communication throughput measuring part 201 measures communication throughput in transmission of data by the data transmitting part 206 to be described later.

The rate controlling part 204 calculates (determines) an encoding rate r* of data to be transmitted at future time t, based on drift $\mu$ calculated by the drift calculating part 202, variance $\sigma^2$ calculated by the variance calculating part 203, Formula 9, and Formula 10. In this exemplary embodiment, an encoding rate forms a control parameter used for transmitting data.

To be specific, the rate controlling part 204 calculates an encoding rate r* that minimizes the value of an evaluation function J shown by Formula 10 under a constraint condition that a remaining reproduction time $T_p(t)$ shown by Formula 9 is always set to a value larger than 0.

$$T_p(t) = T_p(0) + \int_0^t \frac{1}{r}\left(u_0 + \mu\tau - \alpha\sigma\sqrt{\tau}\right)d\tau - pl \quad \text{[Formula 9]}$$

$$J = \int_0^t \left\{ a_1 \frac{1}{r^2} + a_2 (r_{ave} - r)^2 \right\} dt \quad \text{[Formula 10]}$$

A remaining reproduction time $T_p$ [sec] is a time that content can be reproduced based on a part not reproduced yet of data stored in a storage device of a client device. A client device is configured to, while receiving data representing content from the delivery device 200 by streaming, store the received data into the storage device and reproduce the content based on the stored data.

Further, p [dimensionless] is a reproduction rate set in accordance with an instruction from a user. A reproduction rate is a reproduction time of content reproduced per unit time. In other words, a reproduction rate is a value obtained by dividing a content reproduction speed by a reproduction speed corresponding to reproduction at equal speeds. Moreover, r [bps] denotes an encoding rate of data transmitted by the delivery device 200.

Symbol $\alpha$ denotes a coefficient previously set in accordance with a target probability value that is the value of a probability to be the target. The details of the coefficient $\alpha$ will be described later. Moreover, $a_1$ and $a_2$ are preset coefficients, respectively. The details of the coefficient $a_1$ and the coefficient $a_2$ will be described later. Moreover, $r_{ave}$ denotes a value obtained by averaging encoding rates of data transmitted by the delivery device 200 up to the current time point.

In order to prevent reproduction of content in a client device from stopping, it is necessary to always maintain a state in which the remaining reproduction time $T_p(t)$ is larger than 0. Therefore, as described above, the rate controlling part 204 calculates the encoding rate r* under a constraint condition that the remaining reproduction time $T_p(t)$ shown by Formula 9 is set to a value larger than 0 at all times.

Next, a method for deriving Formula 9 will be described.

A range of values that future communication throughput u can take diffuses in direct proportion to the square root $t^{1/2}$ of time t as shown by the probability density function f(u,t) (as shown in FIG. 2).

Therefore, a lower bound value $u_{inf}(t)$ of a target probability range can be obtained as shown by Formula 11. The target probability range is a range of communication throughput, and is a range in which a value obtained by integrating the probability density function f(u,t) over the range is a target probability value. In other words, the target probability value is a probability that actual communication throughput at future time t is equal to or more than the lower bound value $u_{inf}(t)$ of the target probability range.

$$u_{inf}(t) = u_0 + \mu l - \alpha \sigma \sqrt{t} \quad \text{[Formula 11]}$$

In this exemplary embodiment, the target probability value is set to 99.87%. In this case, the target probability range is a range of $-3\sigma \leq u \leq +\infty$. Therefore, the coefficient $\alpha$ is set to 3. In a case where the target probability value is set to 84.13%, the target probability range is a range of $-\sigma \leq u \leq +\infty$. Therefore, the coefficient $\alpha$ is set to 1 in this case.

Further, a differential equation on the remaining reproduction time $T_p$ is expressed as shown by Formula 12.

$$\frac{dT_p}{dt} = \frac{u}{r} - p \quad \text{[Formula 12]}$$

By substituting the lower bound value $u_{inf}(t)$ of the target probability range shown by Formula 11 for the communication throughput u in Formula 12, and integrating both the sides in a range of time 0 to time t, Formula 9 is derived.

Thus, Formula 9 is derived with the assumption that communication throughput is the lower bound value of a target probability range. That is to say, the rate controlling part 204 calculates the encoding rate r* with the assumption that future communication throughput is the lower bound value of a target probability range. Therefore, it can be said that the rate controlling part 204 is configured to calculate an encoding rate that is more fail-safe (i.e., a remaining reproduction time is hard to become equal to or less than 0).

Next, a method for deriving Formula 10 will be described.

The higher the encoding rate of data is, the higher the reproduction quality of content (the image quality of content in a case where the content is a moving image) is. Moreover, change of the reproduction quality of content (flicker in the image quality of content in a case where the content is a moving image) is more inhibited as change of the encoding rate of data received by a client device becomes smaller. As a result, a content reproduction quality felt by the user increases.

That is to say, it is thought to be preferred to determine the evaluation function J so as to have a value that becomes smaller as the encoding rate r becomes higher and that becomes smaller as change of the encoding rate r becomes smaller.

In this exemplary embodiment, a function obtained by integrating the sums of the first term inversely proportional to the square of the encoding rate r and the second term directly proportional to the square of the difference between the average value $r_{ave}$ and the encoding rate r in a range from time 0 to time t is determined as the evaluation function J.

Both a proportionality coefficient $a_1$ of the first term and a proportionality coefficient $a_2$ of the second term are positive values. The first term has a value that is smaller as the encoding rate r is higher. The second term has a value that is smaller as change of the encoding rate r is smaller.

Thus, Formula 10 is derived.

The rate controlling part 204 recalculates the encoding rate r* every time a preset update period passes.

The content accumulating part 205 previously stores (accumulates) data obtained by encoding one content (e.g., information representing a video image or a speech) by a plurality of encoding rates different from each other.

The data transmitting part 206 acquires data encoded by the latest encoding rate r* calculated by the rate controlling part 204 of the data stored by the content accumulating part 205, and transmits (delivers) the acquired data to a client device connected so as to be capable of communicating with the delivery device 200.

In this exemplary embodiment, in a case where data encoded by the encoding rate r* calculated by the rate controlling part 204 is not stored by the content accumulating part 205, the data transmitting part 206 acquires data encoded by the largest encoding rate within a range not exceeding the encoding rate r*.

The data transmitting part 206 may be configured to, in a case where data encoded by the encoding rate r* calculated by the rate controlling part 204 is not stored by the content accumulating part 205, acquire data encoded by an encoding rate closest to the encoding rate r*.

As described above, the delivery device 200 according to the second exemplary embodiment of the present invention can determine an encoding rate with high accuracy based on a probability density function specified with an estimated function specification parameter.

Further, the delivery device 200 according to the second exemplary embodiment of the present invention determines a control parameter with the assumption that communication throughput is the lower bound value of a target probability range.

According to this, it is possible to sufficiently increase a probability that data is transmitted with communication throughput that is high enough for a determined encoding rate. As a result, it is possible to sufficiently decrease a probability that, when the delivery device 200 (a server device) delivers data representing content to a client device by streaming, the reproduction quality of the content in the client device becomes excessively low.

The delivery device 200 according to the second exemplary embodiment is configured to determine an encoding rate as a control parameter, but may be configured to determine a control parameter other than an encoding rate.

Further, the delivery device 200 according to the second exemplary embodiment is configured to determine a control parameter with the assumption that communication throughput is the lower bound value of a target probability range, but may be configured to determine a control parameter with the assumption that communication throughput is the upper bound value of a target probability range.

<Third Exemplary Embodiment>

Next, a delivery system according to a third exemplary embodiment of the present invention will be described. The delivery system according to the third exemplary embodiment is different from the delivery device 200 according to the second exemplary embodiment, in that a client device determines an encoding rate. Therefore, a description will be made below focusing on the different point.

Figure 5:
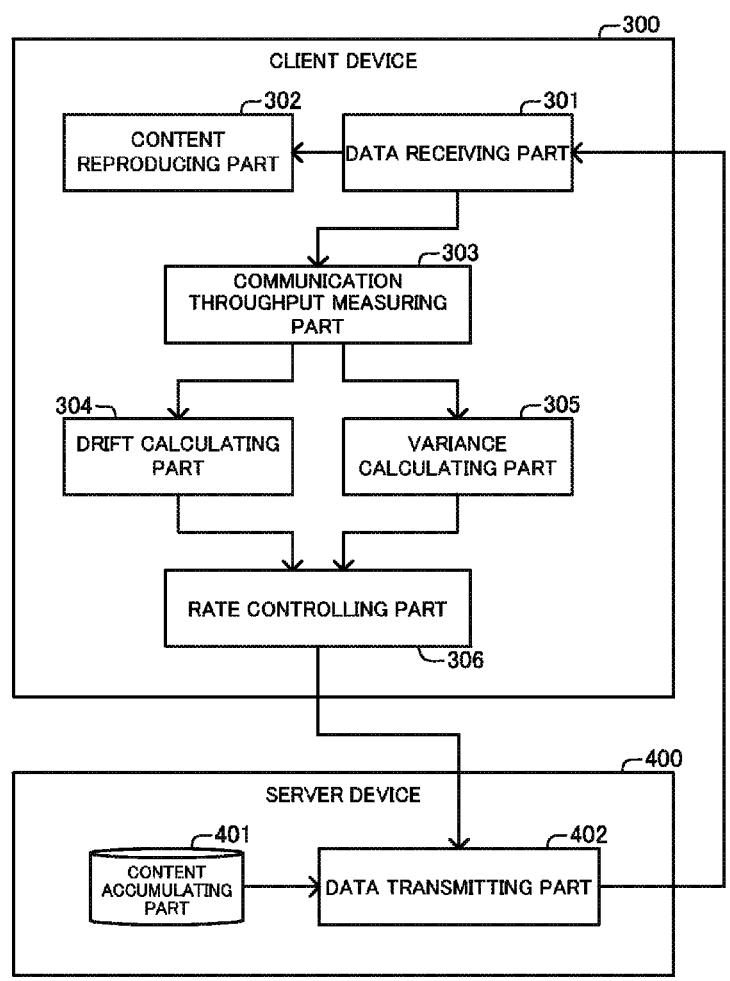
FIG. 5 is a block diagram showing a function of a delivery system according to a third exemplary embodiment of the present invention.

As shown in FIG. 5, a delivery system 1 according to the third exemplary embodiment includes a client device 300 that reproduces content, and a server device 400 that delivers data representing content. The client device 300 and the server device 400 are connected so as to be capable of communicating with each other via a communication network (in this exemplary embodiment, an IP (Internet Protocol) network)).

The client device 300 and the server device 400 are information processing devices, respectively. The client device 300 and the server device 400 each include a central processing unit (CPU) and a storage device (a memory and an HDD), which are not shown in the drawings. Each of the client device 300 and the server device 400 is configured to realize a function to be described later by the CPU's execution of a program stored in the storage device.

(Function)

FIG. 5 is a block diagram showing a function of the delivery system 1 configured as described above.

The function of the client device 300 includes a data receiving part 301, a content reproducing part 302, a communication throughput measuring part (a communication throughput acquiring means) 303, a drift calculating part 304, a variance calculating part 305, and a rate controlling part (a control parameter determining means) 306. The drift calculating part 304 and the variance calculating part 305 configure a function specification parameter estimating means.

While receiving data that represents content and that is transmitted (delivered) by the server device 400, the data receiving part 301 stores the received data into the storage device of the client device 300.

The content reproducing part 302 reproduces content based on the data stored by the storage device. In this exemplary embodiment, the content reproducing part 302 reproduces content via a display and a speaker, which serve as output devices.

The communication throughput measuring part 303, the drift calculating part 304 and the variance calculating part 305 have the same functions as the communication throughput measuring part 101, the drift calculating part 102 and the variance calculating part 103 according to the first exemplary embodiment, respectively. The communication throughput measuring part 303 measures communication throughput in reception of data by the data receiving part 301.

The rate controlling part 306 has the same function as the rate controlling part 204 according to the second exemplary embodiment. Besides, the rate controlling part 306 transmits the calculated encoding rate r* to the server device 400.

The function of the server device 400 includes a content accumulating part 401, and a data transmitting part 402. The content accumulating part 401 has the same function as the content accumulating part 205 according to the second exemplary embodiment.

The data transmitting part 402 receives an encoding rate transmitted by the client device 300. The data transmitting part 402 acquires data encoded by the received latest encoding rate r* of the data stored by the content accumulating part 401, and transmits the acquired data to the client device 300.

In this exemplary embodiment, in a case where data encoded by the received encoding rate r* is not stored by the content accumulating part 401, the data transmitting part 402 acquires data encoded by the largest encoding rate within a range not exceeding the encoding rate r*.

As described above, the delivery system 1 according to the third exemplary embodiment of the present invention can produce actions and effects comparable to those of the delivery device 200 according to the second exemplary embodiment.

<Fourth Exemplary Embodiment>

Next, a communication throughput prediction device according to a fourth exemplary embodiment of the present invention will be described. The communication throughput prediction device according to the fourth exemplary embodiment is different from the communication throughput prediction device 100 according to the first exemplary embodiment, in using a probability density function derived with the assumption that communication throughput changes so as to perform geometric Brownian motion. Therefore, a description will be made below focusing on the different point.

Figure 6:
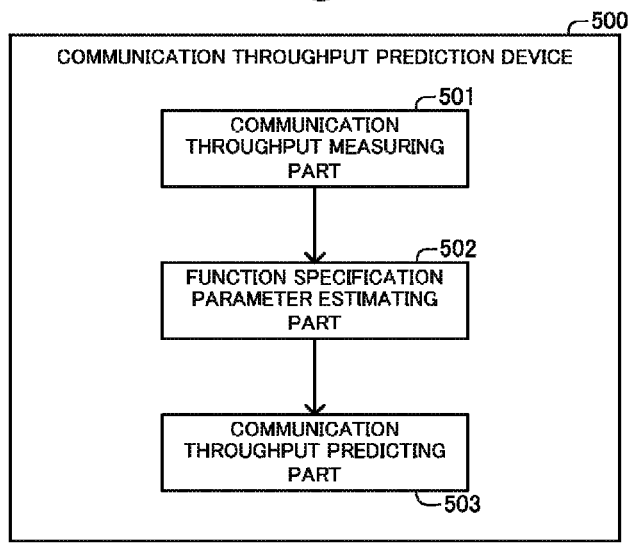
FIG. 6 is a block diagram showing a function of a communication throughput prediction device according to a fourth exemplary embodiment of the present invention.

As shown in FIG. 6, a communication throughput prediction device 500 is an information processing device having a configuration similar to that of the communication throughput prediction device 100 according to the first exemplary embodiment.

(Function)

FIG. 6 is a block diagram showing a function of a communication throughput prediction device 500 configured as described above. The function of the communication throughput prediction device 500 includes a communication throughput measuring part (a communication throughput acquiring means) 501, a function specification parameter estimating part (a function specification parameter estimating means) 502, and a communication throughput predicting part (a communication status estimating means) 503.

The communication throughput measuring part 501 has the same function as the communication throughput measuring part 101 according to the first exemplary embodiment.

The function specification parameter estimating part 502 estimates a function specification parameter for specifying a probability density function with future communication throughput as a random variable, based on communication throughput u measured by the communication throughput measuring part 501.

In this exemplary embodiment, the communication throughput prediction device 500 uses a probability density function f(u,t) derived with the assumption that communication throughput performs geometric Brownian motion, as shown by Formula 13.

$$f(u, t) = \frac{1}{\sqrt{2\pi\theta^2 t}} \exp\left\{-\frac{1}{2\theta^2 t}\left(\log\frac{u}{u_0} - \left(\kappa - \frac{\theta^2}{2}\right)t\right)^2\right\}$$ [Formula 13]

A first parameter κ is also referred to as "percentage drift." The first parameter κ represents the average of increase ratios with respect to communication throughput u at current time. A second parameter θ is also referred to as "percentage volatility." The first parameter κ and the second parameter θ form function specification parameters.

To be specific, the function specification parameter estimating part 502 calculates converted communication throughput u' based on Formula 14 and communication throughput u measured by the communication throughput measuring part 501.

$$u' = \log\frac{u}{u_0}$$ [Formula 14]

Then, the function specification parameter estimating part 502 substitutes the calculated converted communication throughput u' for the communication throughput u in Formula 3, thereby calculating drift μ with respect to the converted communication throughput u'.

Furthermore, the function specification parameter estimating part 502 substitutes the calculated converted communication throughput u' for the communication throughput u in Formula 4, thereby calculating variance $\sigma^2$ with respect to the converted communication throughput u'.

Then, the function specification parameter estimating part 502 calculates (estimates) the first parameter κ and the second parameter θ based on the calculated drift μ, the calculated variance $\sigma^2$, Formula 15, and Formula 16 (i.e., by solving simultaneous equations formed by Formula 15 and Formula 16).

$$\kappa - \frac{\theta^2}{2} = \mu$$ [Formula 15]

$$\theta = \sigma$$ [Formula 16]

The communication throughput predicting part 503 calculates a probability that actual communication throughput at future time t is within a target range, based on the first parameter κ and second parameter θ calculated by the function specification parameter estimating part 502, and the probability density function f(u,t) shown by Formula 13.

The communication throughput predicting part 503 may be configured to calculate the upper bound value and lower bound value of a target probability range at future time t. Moreover, the communication throughput predicting part 503 may be configured to estimate a time required for transmission of data to be completed, based on at least one of the calculated upper bound value and lower bound value of the target probability range.

Further, the communication throughput predicting part 503 may be configured to estimate the amount of data that can be transmitted in a period at or after the first time point, based on at least one of the calculated upper bound value and lower bound value of a target probability range.

Further, the communication throughput predicting part 503 may be configured to calculate an average value (an expected value) E [u(t)] of communication throughput at future time t, based on the first parameter κ calculated by the function specification parameter estimating part 502, and Formula 17.

$$E[u(t)] = u_0 \exp(\kappa t)$$ [Formula 17]

Further, the communication throughput predicting part 503 may be configured to calculate a standard deviation V [u(t)] of communication throughput at future time t, based on the first parameter κ and the second parameter θ calculated by the function specification parameter estimating part 50, and Formula 18.

$$V[u(t)] = u_0^2 \exp(2\kappa t)\{\exp(\theta^2 t) - 1\}$$ [Formula 18]

Thus, it can be said that the communication throughput predicting part 503 stochastically predicts communication throughput u at future time t, based on the first parameter κ and second parameter θ calculated by the function specification parameter estimating part 502 and the probability density function f(u,t) shown by Formula 13.

Herein, a method for deriving Formula 13 will be described. As described above, Formula 13 is derived with the assumption that communication throughput changes so as to perform geometric Brownian motion. Therefore, a stochastic differential equation with respect to communication throughput u is expressed as shown by Formula 19;

$$du = du \cdot dt + \theta u \cdot dW_t$$ [Formula 19]

where Wt denotes the Wiener process.

By solving Formula 19, Formula 20 representing communication throughput u is derived. Moreover, Formula 13 representing a probability density function with future communication throughput u as a random variable is obtained based on Formula 20.

$$u = u_0 \exp\left\{\left(\kappa - \frac{\theta^2}{2}\right)t + \theta W_t\right\}$$ [Formula 20]

As described above, the communication throughput prediction device 500 according to the fourth exemplary embodiment of the present invention can produce actions and effects comparable to those of the communication throughput prediction device 100 according to the first exemplary embodiment.

The delivery device 200 according to the second exemplary embodiment and the delivery system 1 according to the third exemplary embodiment may be each configured to use a probability density function derived with the assumption that communication throughput changes so as to perform geometric Brownian motion.

<Fifth Exemplary Embodiment>

Figure 7:
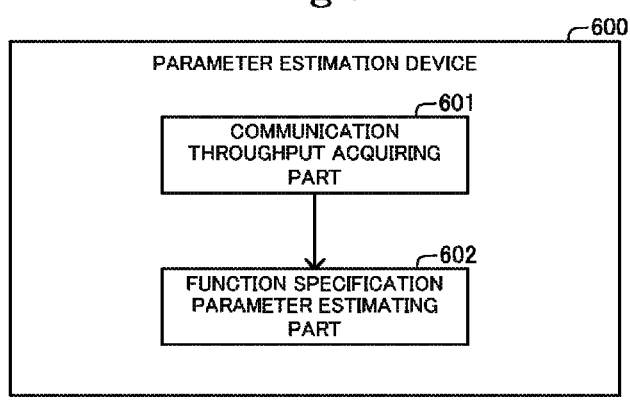
FIG. 7 is a block diagram showing a function of a parameter estimation device according to a fifth exemplary embodiment of the present invention.

Next, a parameter estimation device according to a fifth exemplary embodiment of the present invention will be described referring to FIG. 7.

A parameter estimation device 600 according to the fifth exemplary embodiment includes:

a communication throughput acquiring part (a communication throughput acquiring means) 601 for acquiring communication throughput, which is the amount of data transmitted per unit time; and a function specification parameter estimating part (a function specification parameter estimating means) 602 for estimating a function specification parameter for specifying a probability density function with future communication throughput as a random variable, based on the acquired communication throughput.

According to this, it is possible to estimate communication throughput with high accuracy based on a probability density function specified with an estimated function specification parameter. Moreover, it is also possible to determine a control parameter such as an encoding rate with high accuracy based on a probability density function specified with an estimated function specification parameter.

<Sixth Exemplary Embodiment>

Next, a delivery system according to a sixth exemplary embodiment of the present invention will be described. The delivery system according to the sixth exemplary embodiment is different from the delivery device 200 according to the second exemplary embodiment, in determining a stoppage time based on a function specification parameter. Herein, a stoppage time is a time to stop transmission of data representing content. Therefore, a description will be made below focusing on the different point.

In a case where the user of a client device stops reproduction of content while a server device is transmitting data representing the content to the client device by streaming, an unreproduced part of the data already received by the client device will not be used. That is to say, this part is data wastefully transmitted from the server device to the client device. There is a fear that such wastefully transmitted data meaninglessly increases communication load.

Then, in the delivery system according to the sixth exemplary embodiment, the server device alternately and repeatedly executes a transmission process of transmitting data representing content to the client device and a stoppage process of stopping transmission of the data for a predetermined stoppage time. At this moment, the server device determines a stoppage time so as to make a remaining reproduction time close to a target remaining reproduction time.

Herein, a remaining reproduction time is a time that the client device can reproduce content based on an unreproduced part of data received by the client device. Moreover, a target remaining reproduction time is a target value of a remaining reproduction time.

Thus, it is possible to avoid wastefully transmitting much data from the server device to the client device.

Figure 8:
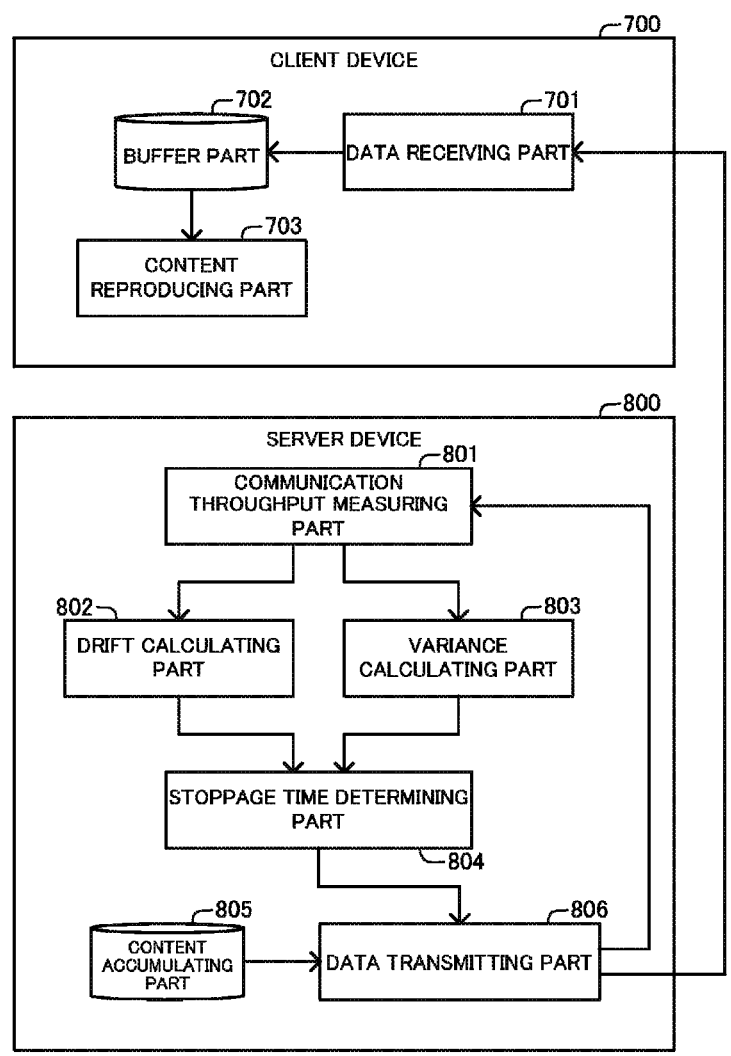
FIG. 8 is a block diagram showing a function of a delivery system according to a sixth exemplary embodiment of the present invention.

To be specific, as shown in FIG. 8, a delivery system 2 according to the sixth exemplary embodiment includes a client device 700 that reproduces content, and a server device (a parameter estimation device) 800 that delivers data representing content. The client device 700 and the server device 800 are connected so as to be capable of communicating with each other via a communication network (in this exemplary embodiment, an IP (Internet Protocol) network).

The client device 700 and the server device 800 are information processing devices respectively. The client device 700 and the server device 800 each include a central processing unit (CPU) and a storage device (a memory and an HDD), which are not shown in the drawings. The client device 700 and the server device 800 are each configured to realize a function to be described later by the CPU's execution of a program stored by the storage device.

(Function)

FIG. 8 is a block diagram showing a function of the delivery system 2 configured as described above.

The function of the client device 700 includes a data receiving part 701, a buffer part 702, and a content reproducing part 703.

While receiving data that represents content and that is transmitted (delivered) by the server device 800, the data receiving part 701 stores the received data into the buffer part 702.

Based on the data stored in the buffer part 702, the content reproducing part 703 reproduces content represented by the data. In this exemplary embodiment, the content reproducing part 703 reproduces content via a display and a speaker that serve as output devices.

The function of the server device 800 includes a communication throughput measuring part (a communication throughput acquiring means) 801, a drift calculating part 802, a variance calculating part 803, a stoppage time determining part (a control parameter determining means) 804, a content accumulating part 805, and a data transmitting part 806. The drift calculating part 802 and the variance calculating part 803 configure a function specification parameter estimating means. The content accumulating part 805 has the same function as the content accumulating part 205 according to the second exemplary embodiment.

The communication throughput measuring part 801, the drift calculating part 802 and the variance calculating part 803 have the same functions as the communication throughput measuring part 101, the drift calculating part 102 and the variance calculating part 103 according to the first exemplary embodiment, respectively. The communication throughput measuring part 801 measures communication throughput in transmission of data by the data transmitting part 806 to be described later.

The stoppage time determining part 804 calculates (determines) a stoppage time based on drift $\mu$ calculated by the drift calculating part 802 and variance $\sigma^2$ calculated by the variance calculating part 803. In this exemplary embodiment, a stoppage time forms a control parameter used for transmitting data. The detailed function of the stoppage time determining part 804 will be described later.

The data transmitting part 806 alternately and repeatedly executes a transmission process of transmitting data stored by the content accumulating part 805 to the client device 700 by streaming, and a stoppage process of stopping transmission of the data for a stoppage time determined by the stoppage time determining part 804.

The data transmitting part 806 transmits a preset data amount of data in one transmission process. That is to say, data transmitted by the data transmitting part 806 in one transmission process is one of a plurality of partial data generated by dividing data representing content by the data amount.

Herein, the detailed function of the stoppage time determining part 804 will be described.

Every time the data transmitting part 806 ends execution of a transmission process, the stoppage time determining part 804 determines a stoppage time in a stoppage process executed by the data transmitting part 806 next, at a time point of ending execution of the transmission process.

Next, the outline of a method for determining a stoppage time will be described.

The stoppage time determining part 804 determines a stoppage time so as to make a remaining reproduction time close to a preset target remaining reproduction time, within a range that the remaining reproduction time is kept equal to or more than the target remaining reproduction time.

Herein, a remaining reproduction time is a time that the client device 700 can reproduce content based on an unreproduced part of data stored in the buffer part 702 of the client device 700 (i.e., data received by the client device 700). Moreover, a target remaining reproduction time is a target value (e.g., 10 seconds, 30 seconds, etc.) of a remaining reproduction time.

In this exemplary embodiment, the stoppage time determining part 804 determines a stoppage time with the assumption that future communication throughput is the lower bound value of a target probability range.

Next, the details of the stoppage time determining method will be described.

Herein, a case where data representing content is divided into n partial data (segments) $v_i$ (i=1, 2, . . . , n) will be assumed. Let the data size (data amount) of each partial data $v_i$ be $s_i$. Moreover, let a reproduction time be $\tau_i$, which is a time that content can be reproduced based on each partial data $v_i$.

A case where, at a time point that the data transmitting part 806 ends execution of a transmission process of transmitting i-1$^{th}$ partial data $v_{i-1}$, the stoppage time determining part 804 determines a stoppage time $a_1$ in a stoppage process executed immediately before a transmission process of transmitting i$^{th}$ partial data $v_i$ will be assumed. A time point t that the data transmitting part 806 ends execution of the transmission process of transmitting the i-1$^{th}$ partial data $v_{i-1}$ is set to 0.

First, the stoppage time determining part 804 determines whether Formula 21 holds or not. When Formula 21 holds, it is possible to complete transmission of the i$^{th}$ partial data $v_i$ in a period within a range of the time point t from 0 (a current time point) to a transmission ending upper bound time point $T_{sup}$ (i.e., a period from the current time point to a time point the transmission ending upper bound time point $T_{sup}$ later).

$$\int_0^{T_{sup}} u_{inf}(t)\,dt \geq s_i \qquad \text{[Formula 21]}$$

A transmission ending upper bound time point $T_{sup}$ is expressed by Formula 22, where a communication throughput boundary time point $t_c$ is a time point that a lower bound value $u_{inf}(t)$ of a target probability range of communication throughput becomes 0, and an estimation accuracy upper bound time point I is an upper bound time point that the accuracy of estimation of communication throughput is kept relatively high. The estimation accuracy upper bound time point I is a preset value. It is preferred that the estimation accuracy upper bound time point I is set to a value within a range from ten seconds to tens of seconds.

$$T_{sup} = \min\{t_c, I\} \qquad \text{[Formula 22]}$$

The communication throughput boundary time point $t_c$ can be obtained by solving Formula 23 representing that the lower bound value $u_{inf}(t)$ of the target probability range is equal to 0.

$$u_0 + \mu t - \alpha \sigma \sqrt{t} = 0 \qquad \text{[Formula 23]}$$

In a case where drift $\mu$ calculated by the drift calculating part 802 is 0, Formula 24 is derived from Formula 23. Therefore, the stoppage time determining part 804 calculates the communication throughput boundary time point $t_c$ based on Formula 25.

$$\alpha^2 \sigma^2 t - u_0^2 = 0 \qquad \text{[Formula 24]}$$

$$t_c = \left(\frac{u_0}{\alpha \sigma}\right)^2 \qquad \text{[Formula 25]}$$

In a case where drift $\mu$ calculated by the drift calculating part 802 is not 0, Formula 26 is derived from Formula 23.

Moreover, Formula 27 that is a quadratic equation for the time point t is derived from Formula 26.

$$(u_0 + \mu t)^2 = (\alpha \sigma \sqrt{t})^2 \qquad \text{[Formula 26]}$$

$$\mu^2 t^2 + (2\mu u_0 - \alpha^2 \sigma^2) t + u_0^2 = 0 \qquad \text{[Formula 27]}$$

A discriminant of Formula 27, representing whether a solution in a range of real numbers exists or not, is expressed as shown by Formula 28.

$$D = \alpha^2 \sigma^2 (\alpha^2 \sigma^2 - 4\mu u_0) \qquad \text{[Formula 28]}$$

In a case where a value D in Formula 28 is negative, a solution of Formula 27 in the range of real numbers does not exist. Therefore, in this case, the stoppage time determining part 804 sets the communication throughput boundary time point $t_c$ to $\infty$ as shown by Formula 29.

$$t_c = \infty \text{ where } D < 0 \qquad \text{[Formula 29]}$$

On the other hand, in a case where the value D in Formula 28 is equal to or more than 0, a solution of Formula 27 in the range of real numbers exists. Therefore, in this case, the stoppage time determining part 804 calculates the communication throughput boundary time point $t_c$ based on Formula 30.

$$t_c = \frac{\alpha^2 \sigma^2 - 2\mu u_0 - \alpha \sigma \sqrt{\alpha^2 \sigma^2 - 4\mu u_0}}{2\mu^2} \text{ where } \qquad \text{[Formula 30]}$$
$$D \geq 0$$

In the case of determining that Formula 21 does not hold, the stoppage time determining part 804 determines that the stoppage time $a_i$ is 0. In this case, even if transmitting data throughout a period from the current time point to the transmission ending upper bound time point $T_{sup}$, it is impossible to complete transmission of the i$^{th}$ partial data $v_i$. Therefore, it is preferred to start transmission of the i$^{th}$ partial data $v_i$ immediately at the current time point. Consequently, it is possible to prevent a remaining reproduction time in the client device 700 from becoming excessively short.

On the other hand, in the case of determining that Formula 21 holds, the stoppage time determining part 804 calculates a minimum remaining reproduction time $T_{min}(0)$ and a minimum remaining reproduction time $T_{min}(T_{sup})$, respectively. Herein, a minimum remaining reproduction time $T_{min}(a_i)$ is the minimum value of a remaining reproduction time $T_p(t)$ in a period from a current time point to a transmission ending time point $b_i$. The transmission ending time point $b_i$ is a time point to end (complete) transmission of the i$^{th}$ partial data $v_i$. The minimum remaining reproduction time $T_{min}(a_i)$ is expressed by Formula 31.

$$T_{min}(a_i) = \min_{t \in [0, b_i]} T_p(t) \qquad \text{[Formula 31]}$$

The remaining reproduction time $T_p(t)$ at the time point t is expressed by Formula 32 and Formula 33.

$$T_p(t) = T_p(0) - t \ \ t \in [0, a_i) \qquad \text{[Formula 32]}$$

-continued $$T_p(t) = T_p(0) - t + \frac{\int_{a_i}^{t} u_{inf}(\xi)\, d\xi}{s_i} \tau_i \quad \text{[Formula 33]}$$

$$t \in [a_i, b_i]$$

Further, the transmission ending time point $b_i$ is obtained by Formula 34. Formula 34 is derived from Formula 35. The stoppage time $a_i$ is also referred to as a transmission starting time point because transmission of the $i^{th}$ partial data $v_i$ starts at a time point that is a stoppage time after the current time point.

$$u_0(b_i - a_i) + \frac{1}{2}\mu(b_i^2 - a_i^2) - \frac{3}{2}\alpha\sigma\left(b_i^{\frac{3}{2}} - a_i^{\frac{3}{2}}\right) = s_i \quad \text{[Formula 34]}$$

$$\int_{a_i}^{b_i} u_{inf}(t)\, dt = s_i \quad \text{[Formula 35]}$$

The minimum remaining reproduction time $T_{min}(a_i)$ monotonically decreases in accordance with increase of the stoppage time $a_i$. Therefore, in a case where the minimum remaining reproduction time $T_{min}(0)$ is smaller than a target remaining reproduction time $T_r$, the stoppage time determining part 804 determines the stoppage time $a_i$ as 0.

Further, in a case where the minimum remaining reproduction time $T_{min}(0)$ is equal to or more than the target remaining reproduction time $T_r$, and the minimum remaining reproduction time $T_{min}(T_{sup})$ is smaller than the target remaining reproduction time $T_r$, the stoppage time determining part 804 determines the stoppage time $a_i$ so as to make the minimum remaining reproduction time $T_{min}(a_i)$ coincide with the target remaining reproduction time $T_r$.

To be specific, the stoppage time determining part 804 calculates a minimum remaining reproduction time $T_{min}(c_i)$ with respect to each of a plurality of provisional stoppage times $c_i$ different from each other within a range from a current time point (t=0) to a transmission ending upper bound time point (t=$T_{sup}$), and determines the provisional stoppage time $c_i$ that the minimum remaining reproduction time $T_{min}(c_i)$ closest to the target remaining reproduction time $T_r$ is calculated based on, as the stoppage time $a_i$.

Further, in a case where the minimum remaining reproduction time $T_{min}(T_{sup})$ is larger than the target remaining reproduction time $T_r$, the stoppage time determining part 804 sets the transmission ending time point $b_i$ to the transmission ending upper bound time point $T_{sup}$. Moreover, the stoppage time determining part 804 determines the stoppage time $a_i$ based on the transmission ending time point $b_i(=T_{sup})$ and Formula 34.

Thus, it can be said that the stoppage time determining part 804 determines the stoppage time $a_i$ so as to make the remaining reproduction time $T_p(t)$ close to the target remaining reproduction time $T_r$ in a range that the remaining reproduction time $T_p(t)$ is kept equal to or more than the target remaining reproduction time $T_r$.

Next, an effect produced by the delivery system 2 according to this exemplary embodiment will be described.

Figure 9:
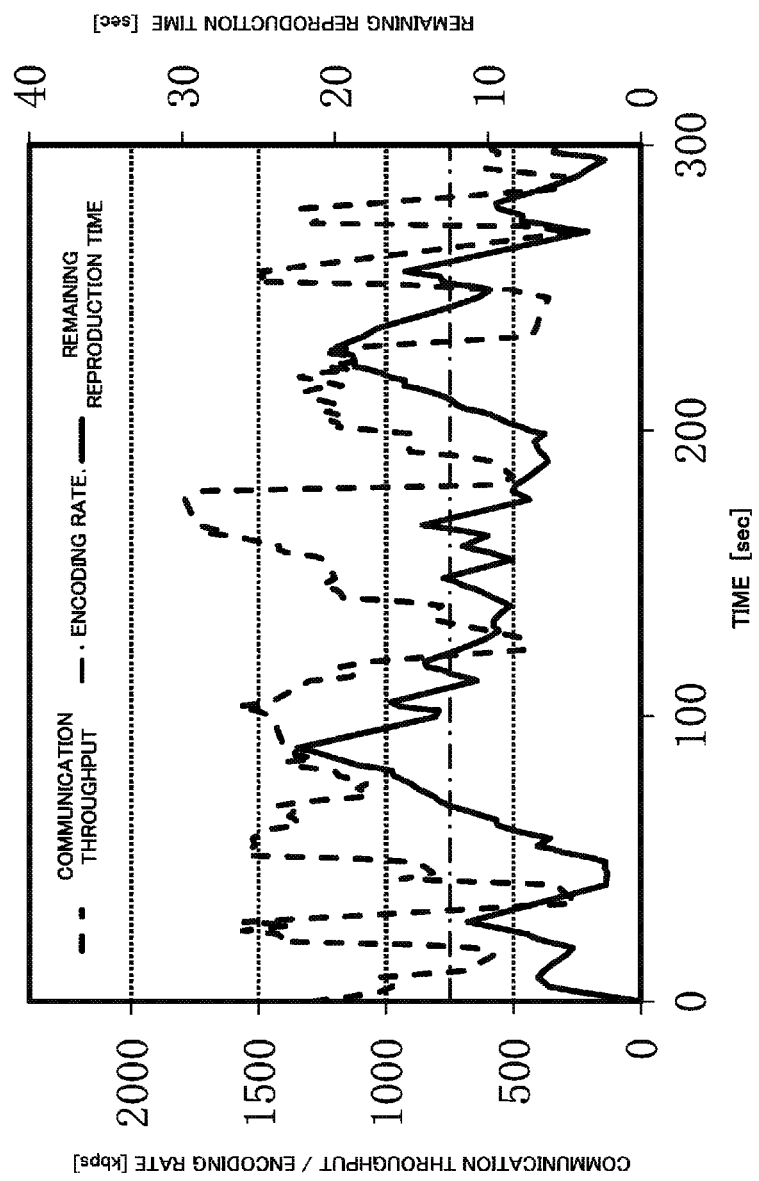
FIG. 9 is a graph showing change of a remaining reproduction time in the delivery system according to the sixth exemplary embodiment of the present invention.

FIG. 9 is a graph showing change of a remaining reproduction time in the delivery system 2. In FIG. 9, a dashed line represents communication throughput, a dashed dotted line represents an encoding rate, and a continuous line represents a remaining reproduction time.

Herein, a case where data representing content that an encoding rate is 750 kbps is transmitted is assumed. The target remaining reproduction time Tr is set to 10 seconds. The data size of each partial data $v_i$ is a size that enables reproduction of content based on the partial data $v_i$ for ten seconds.

Further, in this exemplary embodiment, communication throughput relatively largely changes as shown in FIG. 9. Even in such a case, according to the delivery system 2, it is possible avoid that a remaining reproduction time becomes 0, and it is also possible to prevent a remaining reproduction time from becoming excessively large.

Figure 10:
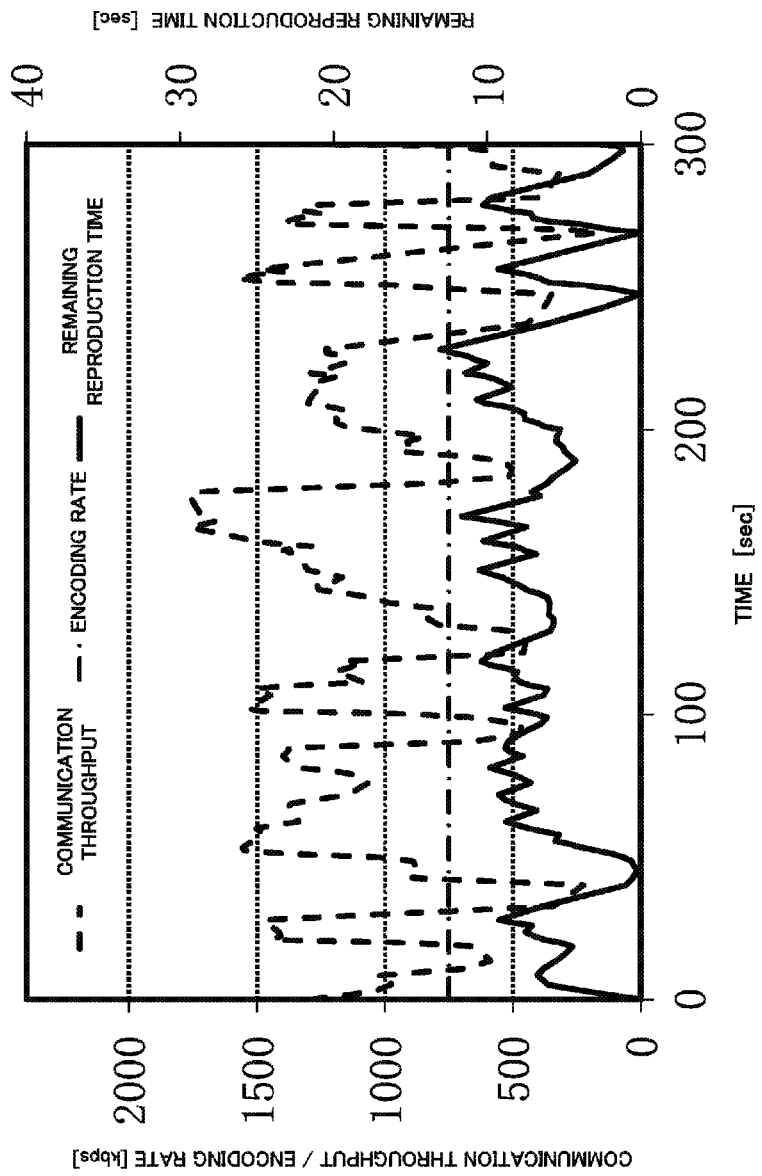
FIG. 10 is a graph showing change of a remaining reproduction time in a delivery system that is a comparison example.

On the other hand, FIG. 10 is a graph showing change of a remaining reproduction time in a delivery system of a comparison example (a comparison delivery system). This comparison delivery system is different from the delivery system 2 in determining a stoppage time with the assumption that communication throughput has the same value as communication throughput at a current time point at all times in the future.

As shown in FIG. 10, according to this comparison delivery system, a remaining reproduction time may become 0. That is to say, there is a relatively high probability that a remaining reproduction time becomes excessively short and the content reproduction quality in a client device thereby lowers excessively.

As described above, the server device 800 according to the sixth exemplary embodiment of the present invention can determine a stoppage time with high accuracy based on a probability density function specified with an estimated function specification parameter.

Further, the server device 800 according to the sixth exemplary embodiment of the present invention determines a stoppage time of a control parameter with the assumption that communication throughput is the lower bound value of a target probability range.

According to this, it is possible to sufficiently increase a probability that data is transmitted with sufficiently high communication throughput with respect to a determined stoppage time. As a result, it is possible to sufficiently decrease a probability that the content reproduction quality in the client device 700 excessively lowers.

Further, the server device 800 according to the sixth exemplary embodiment of the present invention determines a stoppage time so as to make a remaining reproduction time close to a target remaining reproduction time in a range that the remaining reproduction time is kept equal to or more than the target remaining reproduction time.

According to this, it is possible to avoid that a remaining reproduction time becomes excessively short. As a result, it is possible to more securely avoid that the content reproduction quality in the client device 700 excessively lowers.

Next, the delivery system 2 according to a modified example of the sixth exemplary embodiment will be described. The delivery system 2 according to this modified example is different from the delivery system 2 according to the sixth exemplary embodiment in that the stoppage time determining method is simplified. Therefore, a description will be made below focusing on the different point.

The stoppage time determining part 804 according to this modified example determines the stoppage time $a_i$ so as to make a remaining reproduction time $T_p(b_i)$ at the transmission ending time point $b_i$, which is a time point of ending (completing) transmission of the $i^{th}$ partial data $v_i$ close to the target remaining reproduction time $T_r$.

The remaining reproduction time $T_p(b_i)$ at the transmission ending time point $b_i$ is obtained by Formula 36 derived from Formula 33.

$$T_p(b_i)=T_p(0)-b_i+\tau_i \quad \text{[Formula 36]}$$

Letting a time point that the remaining reproduction time $T_p(t)$ coincides with the target remaining reproduction time $T_r$ be a target coincident time point $b_r$, the target coincident time point $b_r$ is expressed by Formula 37 derived from Formula 36.

$$b_r=T_p(0)+\tau_i-T_r \quad \text{[Formula 37]}$$

First, the stoppage time determining part 804 calculates the target coincident time point $b_r$ based on Formula 37.

Then, in a case where the target coincident time point $b_r$ has a value within a range from 0 to the transmission ending upper bound time point $T_{sup}$, the stoppage time determining part 804 determines the target coincident time point $b_r$ as the transmission ending time point $b_i$.

On the other hand, in a case where the target coincident time point $b_r$ does not have a value within the range from 0 to the transmission ending upper bound time point $T_{sup}$, the stoppage time determining part 804 determines the transmission ending upper bound time point $T_{sup}$ as the transmission ending time point $b_i$.

Then, the stoppage time determining part 804 determines the stoppage time $a_i$ based on the determined transmission ending time point $b_i$ and Formula 34. At this moment, in a case where the stoppage time $a_i$ does not have a value within a range from 0 to the transmission ending time point $b_i$, the stoppage time determining part 804 resets the stoppage time $a_i$ to 0.

Thus, the stoppage time determining part 804 determines the stoppage time $a_i$ so as to make the remaining reproduction time $T_p(b_i)$ at the transmission ending time point $b_i$ close to the target remaining reproduction time $T_r$.

The delivery system 2 according to this modified example can also produce actions and effects comparable to the delivery system 2 according to the sixth exemplary embodiment.

Although the present invention is described above referring to the exemplary embodiments, the present invention is not limited to the exemplary embodiments. The configurations and details of the present invention can be modified in various manners that can be understood by one skilled in the art within the scope of the present invention.

For example, in each of the exemplary embodiments, the parameter estimation device is configured to estimate a function specification parameter for specifying a probability density function in which a random variable is communication throughput at a second time point later than a first time point, based on communication throughput acquired by the first time point. However, in a modified example of each of the exemplary embodiments, the parameter estimation device may be configured to, based on communication throughput acquired in a certain period, estimate a function specification parameter for specifying a probability density function in which a random variable is communication throughput at a time point before (earlier than) the period.

The respective functions of the parameter estimation device in each of the exemplary embodiments are realized by the CPU's execution of the program (software), but may be realized by hardware such as circuits.

Further, the program is stored in the storage device in each of the exemplary embodiments, but may be stored in a computer-readable recording medium. For example, the recording medium is a portable medium such as a flexible disk, an optical disk, a magneto-optical disk, and a semiconductor memory.

Further, as another modified example of each of the exemplary embodiments, any combinations of the abovementioned exemplary embodiments and modified examples may be employed.

<Supplementary Notes>

The whole or part of the exemplary embodiments disclosed above can be described as, but not limited to, the following supplementary notes.

(Supplementary Note 1)

A parameter estimation device including:

a communication throughput acquiring means for acquiring communication throughput that is an amount of data transmitted per unit time; and a function specification parameter estimating means for estimating a function specification parameter for specifying a probability density function where communication throughput at a second time point later than a first time point is a random variable, based on the communication throughput acquired by the first time point.

According to this, it is possible to increase the accuracy of estimation of communication throughput. Therefore, for example, it is possible to estimate communication throughput with high accuracy based on a probability density function specified with an estimated function specification parameter. Also, it is possible to determine a control parameter such as an encoding rate with high accuracy based on a probability density function specified with an estimated function specification parameter.

(Supplementary Note 2)

The parameter estimation device according to Supplementary Note 1, including a control parameter determining means for determining a control parameter used for transmitting data, based on the estimated function specification parameter.

According to this, it is possible to determine a control parameter such as an encoding rate with high accuracy.

(Supplementary Note 3)

The parameter estimation device according to Supplementary Note 2, wherein the control parameter determining means is configured to determine the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

(Supplementary Note 4)

The parameter estimation device according to Supplementary Note 2 or 3, wherein:

the control parameter is an encoding rate of the data to be transmitted; and the control parameter determining means is configured to determine the encoding rate with an assumption that the communication throughput is a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

According to this, it is possible to sufficiently increase a probability that data is transmitted with sufficiently high communication throughput for a determined encoding rate. As a result, for example, in a case where a server device delivers data representing content to a client device by streaming, it is possible to sufficiently decrease a probability that the content reproduction quality in the client device excessively lowers.
(Supplementary Note 5)

The parameter estimation device according to Supplementary Note 2 or 3, being configured to alternately and repeatedly execute a transmission process of transmitting the data representing content to a client device by streaming and a stoppage process of stopping transmission of the data for a predetermined stoppage time, wherein:

the control parameter is the stoppage time; and the control parameter determining means is configured to determine the stoppage time so as to make a remaining reproduction time close to a preset target remaining reproduction time, the remaining reproduction time being a time allowing reproduction of the content based on an unreproduced part of the data received by the client device, with an assumption that the communication throughput is a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

According to this, it is possible to sufficiently increase a probability that data is transmitted with sufficiently high communication throughput for a determined stoppage time. As a result, it is possible to sufficiently decrease a probability that the content reproduction quality in the client device excessively lowers.
(Supplementary Note 6)

The parameter estimation device according to Supplementary Note 5, wherein the control parameter determining means is configured to determine the stoppage time in the stoppage process to be executed next, at a time point of ending execution of the transmission process.
(Supplementary Note 7)

The parameter estimation device according to Supplementary Note 5 or 6, wherein the control parameter determining means is configured to determine the stoppage time so as to make the remaining reproduction time close to the target remaining reproduction time in a range in which the remaining reproduction time is kept equal to or more than the target remaining reproduction time.

According to this, it is possible to avoid that a remaining reproduction time becomes excessively short. As a result, it is possible to more securely avoid that the content reproduction quality in the client device excessively lowers.
(Supplementary Note 8)

The parameter estimation device according to any of Supplementary Notes 1 to 7, including a communication status estimating means for estimating at least one among the communication throughput, a time required for transmission of data to be completed, and an amount of data that can be transmitted in a period at or after the first time point, based on the estimated function specification parameter.

According to this, it is possible to estimate communication throughput, a time required for transmission of data to be completed, and/or the amount of data that can be transmitted in a period at or after a first time point, with high accuracy based on a probability density function specified with an estimated function specification parameter.
(Supplementary Note 9)

The parameter estimation device according to any of Supplementary Notes 1 to 8, wherein the probability density function is a function derived with an assumption that the communication throughput changes so as to perform Brownian motion.

Change of communication throughput is well expressed by Brownian motion. Therefore, according to the parameter estimation device configured as described above, it is possible to estimate communication throughput with high accuracy, and it is also possible to determine a control parameter with high accuracy.
(Supplementary Note 10)

The parameter estimation device according to any of Supplementary Notes 1 to 8, wherein the probability density function is a function derived with an assumption that the communication throughput changes so as to perform Brownian motion with drift.

Change of communication throughput is well expressed by Brownian motion with drift. Therefore, according to the parameter estimation device configured as described above, it is possible to estimate communication throughput with high accuracy, and it is also possible to determine a control parameter with high accuracy.
(Supplementary Note 11)

The parameter estimation device according to any of Supplementary Notes 1 to 8, wherein the probability density function is a function derived with an assumption that the communication throughput changes so as to perform geometric Brownian motion.

Change of communication throughput is well expressed by geometric Brownian motion. Therefore, according to the parameter estimation device configured as described above, it is possible to estimate communication throughput with high accuracy, and it is also possible to determine a control parameter with high accuracy.
(Supplementary Note 12)

A parameter estimation method including:

acquiring communication throughput that is an amount of data transmitted per unit time; and estimating a function specification parameter for specifying a probability density function where communication throughput at a second time point later than a first time point is a random variable, based on the communication throughput acquired by the first time point.
(Supplementary Note 13)

The parameter estimation method according to Supplementary Note 12, including determining a control parameter used for transmitting data, based on the estimated function specification parameter.
(Supplementary Note 14)

The parameter estimation method according to Supplementary Note 13, including determining the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.
(Supplementary Note 15)

The parameter estimation method according to any of Supplementary Notes 12 to 14, including estimating at least one among the communication throughput, a time required for transmission of data to be completed, and an amount of data that can be transmitted in a period at or after the first time point, based on the estimated function specification parameter.

(Supplementary Note 16)

A parameter estimation program including instructions for causing an information processing device to perform operations including:

acquiring communication throughput that is an amount of data transmitted per unit time; and estimating a function specification parameter for specifying a probability density function where communication throughput at a second time point later than a first time point is a random variable, based on the communication throughput acquired by the first time point.

(Supplementary Note 17)

The parameter estimation program according to Supplementary Note 16, including instructions for causing the information processing device to further perform operations including determining a control parameter used for transmitting data, based on the estimated function specification parameter.

(Supplementary Note 18)

The parameter estimation program according to Supplementary Note 17, wherein the operations include determining the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

(Supplementary Note 19)

The parameter estimation program according to any of Supplementary Notes 16 to 18, including instructions for causing the information processing device to further perform operations including estimating at least one among the communication throughput, a time required for transmission of data to be completed, and an amount of data that can be transmitted in a period at or after the first time point, based on the estimated function specification parameter.

The present invention is based upon and claims the benefit of priority from Japanese patent application No. 2011-151349, filed on Jul. 8, 2011, and Japanese patent application No. 2011-192642, filed on Sep. 5, 2011, the disclosures of which are incorporated herein in their entirety by reference.

Industrial Applicability

The present invention can be applied to a communication throughput prediction device that estimates communication throughput, a control parameter determination device that determines a control parameter used for transmitting data, and so on.

DESCRIPTION OF REFERENCE NUMERALS 1 delivery system
100 communication throughput prediction device
101 communication throughput measuring part
102 drift calculating part
103 variance calculating part
104 communication throughput predicting part
200 delivery device
201 communication throughput measuring part
202 drift calculating part
203 variance calculating part
204 rate controlling part
205 content accumulating part
206 data transmitting part
300 client device
301 data receiving part
302 content reproducing part
303 communication throughput measuring part
304 drift calculating part
305 variance calculating part
306 rate controlling part
400 server device
401 content accumulating part
402 data transmitting part
500 communication throughput prediction device
501 communication throughput measuring part
502 function specification parameter estimating part
503 communication throughput predicting part
600 parameter estimation device
601 communication throughput acquiring part
602 function specification parameter estimating part
2 delivery system
700 client device
701 data receiving part
702 buffer part
703 content reproducing part
800 server device
801 communication throughput measuring part
802 drift calculating part
803 variance calculating part
804 stoppage time determining part
805 content accumulating part
806 data transmitting part

The invention claimed is:

1. A parameter estimation device comprising:
a communication throughput acquiring unit for acquiring communication throughput that is an amount of data transmitted per unit time;
a function specification parameter estimating unit for estimating a function specification parameter for specifying a probability density function where communication throughput at a second time point later than a first time point is a random variable, based on the communication throughput acquired by the first time point, wherein the probability density function is a function derived with an assumption that the communication throughput changes so as to perform Brownian motion with drift; and
a control parameter determining unit for determining a control parameter used for transmitting data, based on the estimated function specification parameter.

2. The parameter estimation device according to claim 1, wherein the control parameter determining unit is configured to determine the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

3. The parameter estimation device according to claim 1, wherein:
the control parameter is an encoding rate of the data to be transmitted; and
the control parameter determining unit is configured to determine the encoding rate with an assumption that the communication throughput is a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

4. The parameter estimation device according to claim 1, being configured to alternately and repeatedly execute a transmission process of transmitting the data representing content to a client device by streaming and a stoppage process of stopping transmission of the data for a predetermined stoppage time, wherein:
the control parameter is the stoppage time; and
the control parameter determining unit is configured to determine the stoppage time so as to make a remaining reproduction time close to a preset target remaining reproduction time, the remaining reproduction time being a time allowing reproduction of the content based on an unreproduced part of the data received by the client device, with an assumption that the communication throughput is a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

5. The parameter estimation device according to claim 4, wherein the control parameter determining unit is configured to determine the stoppage time in the stoppage process to be executed next, at a time point of ending execution of the transmission process.

6. The parameter estimation device according to claim 4, wherein the control parameter determining unit is configured to determine the stoppage time so as to 4 make the remaining reproduction time close to the target remaining reproduction time in a range in which the remaining reproduction time is kept equal to or more than the target remaining reproduction time.

7. The parameter estimation device according to claim 1, comprising a communication status estimating unit for estimating at least one among the communication throughput, a time required for transmission of data to be completed, and an amount of data that can be transmitted in a period at or after the first time point based on the estimated function specification parameter.

8. The parameter estimation device according to claim 1, wherein the probability density function is a function derived with an assumption that the communication throughput changes so as to perform Brownian motion.

9. The parameter estimation device according to claim 1, wherein the probability density function is a function derived with an assumption that the communication throughput changes so as to perform geometric Brownian motion.

10. A parameter estimation method comprising:
acquiring communication throughput that is an amount of data transmitted per unit time;
estimating a function specification parameter for specifying a probability density function where communication throughput at a second time point later than a first time point is a random variable, based on the communication throughput acquired by the first time point, wherein the probability density function is a function derived with an assumption that the communication throughput changes so as to perform Brownian motion with drift; and
determining a control parameter used for transmitting data, based on the estimated function specification parameter.

11. The parameter estimation method according to claim 10, comprising determining the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

12. The parameter estimation method according to claim 10, comprising estimating at least one among the communication throughput, a time required for transmission of data to be completed, and an amount of data that can be transmitted in a period at or after the first time point, based on the estimated function specification parameter.

13. A non-transitory computer-readable medium storing a parameter estimation program comprising instructions for causing an information processing device to perform operations including:
acquiring communication throughput that is an amount of data transmitted per unit time;
estimating a function specification parameter for specifying a probability density function where communication throughput at a second time point later than a first time point is a random variable, based on the communication throughput acquired by the first time point, wherein the probability density function is a function derived with an assumption that the communication throughput changes so as to perform Brownian motion with drift; and
determining a control parameter used for transmitting data, based on the estimated function specification parameter.

14. The non-transitory computer-readable medium according to claim 13, storing the parameter estimation program, wherein the operations include determining the control parameter with an assumption that the communication throughput is an upper bound value or a lower bound value of a target probability range, the target probability range being a range of the communication throughput, and the target probability range being a range in which a value obtained by integrating the probability density function specified with the estimated function specification parameter over the range is a target probability value that is a value of a probability to be a target.

15. The non-transitory computer-readable medium according to claim 13, storing the parameter estimation program comprising instructions for causing the information processing device to further perform operations including estimating at least one among the communication throughput, a time required for transmission of data to be completed, and an amount of data that can be transmitted in a period at or after the first time point, based on the estimated function specification parameter.

* * * * *